United States Patent
Wei et al.

(10) Patent No.: US 11,214,049 B2
(45) Date of Patent: Jan. 4, 2022

(54) PREPARATION SYSTEM AND PREPARATION METHOD FOR GEL COMPOSITE MATERIAL

(71) Applicant: GUANGDONG ALISON HI-TECH CO., LTD., Qingyuan (CN)

(72) Inventors: Ronghui Wei, Qingyuan (CN); Qiuhua Zhang, Qingyuan (CN); Ping Liu, Qingyuan (CN); Liangbo Rao, Qingyuan (CN)

(73) Assignee: GUANGDONG ALISON HI-TECH CO., LTD., Qingyuan (CN)

( * ) Notice: Subject to any disclaimer, the term of this patent is extended or adjusted under 35 U.S.C. 154(b) by 0 days.

(21) Appl. No.: 16/967,899

(22) PCT Filed: Mar. 30, 2018

(86) PCT No.: PCT/CN2018/081443
§ 371 (c)(1),
(2) Date: Aug. 6, 2020

(87) PCT Pub. No.: WO2019/153470
PCT Pub. Date: Aug. 15, 2019

(65) Prior Publication Data
US 2021/0023833 A1 Jan. 28, 2021

(30) Foreign Application Priority Data

Feb. 8, 2018 (CN) .......................... 201810130441.1

(51) Int. Cl.
*B32B 5/00* (2006.01)
*B32B 18/00* (2006.01)
(Continued)

(52) U.S. Cl.
CPC .............. *B32B 37/24* (2013.01); *B32B 5/022* (2013.01); *B32B 5/028* (2013.01); *B32B 18/00* (2013.01);
(Continued)

(58) Field of Classification Search
CPC .. B32B 5/00; B32B 5/02; B32B 5/022; B32B 5/028; B32B 18/00; B32B 37/00;
(Continued)

(56) References Cited

U.S. PATENT DOCUMENTS 4,369,224 A * 1/1983 Cordts .................... B29C 35/10
428/301.4
2018/0326700 A1* 11/2018 Kim ........................ B32B 38/10

FOREIGN PATENT DOCUMENTS

CN 1857792 A 11/2006
CN 101653975 A 2/2010
(Continued)

OTHER PUBLICATIONS

International Search Report, and English Translation thereof, for International Application No. PCT/CN2018/081443, dated Nov. 9, 2018 (6 pages).
(Continued)

*Primary Examiner* — Jacob T Minskey
*Assistant Examiner* — Matthew Hoover
(74) *Attorney, Agent, or Firm* — Kagan Binder, PLLC

(57) ABSTRACT

A preparation system and preparation method for a gel composite material. Periodic impregnation can be performed and the gel composite material product performed gelation can be rewound and recycled; specifically, during the process that the movable impregnation mechanism moves from the front end to the rear end of the impregnation platform, a first unwinding device can be controlled to lay a reinforcing body to be impregnated on a worktable, the impregna-
(Continued)

tion device can be controlled to guide the prefabricated sol onto the reinforcing body to be impregnated, and a second unwinding device can be controlled to cover a covering carrier on an upper surface of the impregnated reinforcing body; when the movable impregnation mechanism moves to the rear end of the impregnation platform, the first unwinding device, the impregnation device, and the second unwinding device can be controlled to stop.

20 Claims, 1 Drawing Sheet

(51) Int. Cl.
  *B32B 37/00*  (2006.01)
  *B32B 38/00*  (2006.01)
  *B32B 41/00*  (2006.01)
  *B32B 37/24*  (2006.01)
  *B32B 5/02*  (2006.01)
  *B32B 37/06*  (2006.01)
  *B32B 38/18*  (2006.01)
(52) U.S. Cl.
  CPC .............. *B32B 37/06* (2013.01); *B32B 38/18* (2013.01); *B32B 41/00* (2013.01); *B32B 2037/243* (2013.01); *B32B 2260/021* (2013.01); *B32B 2260/04* (2013.01); *B32B 2305/08* (2013.01); *B32B 2307/7265* (2013.01)
(58) Field of Classification Search
  CPC ......... B32B 37/06; B32B 37/20; B32B 37/24; B32B 38/00; B32B 38/10; B32B 38/18; B32B 41/00
  See application file for complete search history.

(56) References Cited

FOREIGN PATENT DOCUMENTS

| | | |
|---|---|---|
| CN | 102476500 A | 5/2012 |
| CN | 205873472 U | 1/2017 |
| CN | 106393938 A | 2/2017 |
| EP | 3120983 A1 | 1/2017 |
| KR | 101654795 B1 | 9/2016 |

OTHER PUBLICATIONS

Chinese Office Action, and English Translation thereof, for Chinese Application No. 201810130441.1, dated Feb. 15, 2019 (11 pages).
First Search Report for Chinese Application No. 201810130441.1 (1 page).
Supplementary Search Report for Chinese Application No. 201810130441.1 (1 page).

* cited by examiner

PREPARATION SYSTEM AND PREPARATION METHOD FOR GEL COMPOSITE MATERIAL

TECHNICAL FIELD

The present disclosure relates to the field of gel composite materials, in particular to a system and method for preparing a gel composite material.

BACKGROUND

Impregnation process is widely used in the field of preparation of gel composite materials. The impregnation process refers to a process of impregnating a surface of a material to be reinforced with sol, after the gelation of the sol, a gel composite material is obtained. In a traditional case where the gel composite material is prepared using the impregnation process, it is common to rely on manual operation on an impregnation platform. This operation is complicated and the production efficiency is low, which is not favorable to the reduction of production costs.

SUMMARY

Accordingly, it is necessary to provide a system and a method for preparing a gel composite material that is beneficial to improve production efficiency and reduce production costs.

A system for preparing a gel composite material includes: an impregnation platform having a worktable; and a movable impregnation mechanism comprising a fixing base capable of moving back and forth along the impregnation platform, and a first unwinding device, an impregnation device, a second unwinding device, a third unwinding device, a first rewinding device, and a second rewinding device, which are disposed on the fixing base, wherein the first unwinding device is configured to unwind a to-be-impregnated reinforcing body to lay the reinforcing body to be impregnated on the worktable; the impregnation device is configured to guide a prefabricated sol to the to-be-impregnated reinforcing body laid on the impregnation platform; the second unwinding device is configured to apply a covering carrier on an upper surface of the reinforcing body after impregnating; the third unwinding device is configured to unwind a spacer carrier onto a lower surface of the gelled reinforcing body on the lower surface side of the reinforcing body; the first rewinding device is configured to wind the covering carrier applied on the gelled reinforcing body; and the second rewinding device is configured to wind the gelled reinforcing body covered with the spacer carrier on one side.

In an embodiment, the impregnation platform further has a guide rail, the fixing base is provided with wheels disposed on the guide rail and a moving driving component configured to drive the wheels to move along the guide rail.

In an embodiment, the first unwinding device, the second unwinding device, the third unwinding device, the first rewinding device, and the second rewinding device each has a mounting shaft, a rotation driving component, and a tensile force controlling component, the rotation driving component is correspondingly connected to the mounting shaft to drive the mounting shaft to rotate, the tensile force controlling component is configured to control a tension of stretching.

In an embodiment, the second unwinding device further comprises an unfolding component configured to unfold the covering carrier.

In an embodiment, the impregnation platform is further provided with a temperature controlling device corresponding to the worktable, the temperature controlling device being configured to control a temperature of the worktable.

In an embodiment, a temperature controlling energy source of the temperature controlling device is a fluid medium, microwave, and/or infrared ray.

In an embodiment, the system for preparing the gel composite material further comprises a rewind guiding device configured to guide the covering carrier and the gelled reinforcing body covered with the spacer carrier on one side to the first rewinding device and the second rewinding device, respectively.

In an embodiment, the rewind guiding device comprises a transmission belt and a transmission roller, the transmission belt being engaged with the transmission roller and configured to guide the covering carrier and the gelled reinforcing body covered with the spacer carrier on one side to the first rewinding device and the second rewinding device, respectively.

In an embodiment, the impregnation device comprises a sol container and a sol outlet pipe, the sol outlet pipe being in communication with the sol container to guide the prefabricated sol in the sol container to the to-be-impregnated reinforcing body.

In an embodiment, the impregnation device further comprises an impregnation component disposed at a dispensing end of the sol outlet pipe and configured to impregnate the to-be-impregnated reinforcing body with the prefabricated sol.

In an embodiment, the impregnation device further comprises a heating component configured to heat the prefabricated sol.

In an embodiment, the heating component includes a hot water container and a heat exchanger in communication with the hot water container, the sol outlet pipe extending through the heat exchanger to enable heat exchange between the prefabricated sol and the hot water in the heat exchanger.

In an embodiment, a circulation component is further provided between the hot water container and the heat exchanger, the circulation component is configured to circulate hot water between the hot water container and the heat exchanger.

In an embodiment, a circulation control valve is further provided on a circulation pipe in communication with the hot water container and the heat exchanger, a temperature detecting sensor is provided adjacent to the dispensing end of the sol outlet pipe and is connected to the circulation control valve, such that an opening degree of the circulation control valve is adjusted according to a temperature data of the prefabricated sol detected in real time.

In an embodiment, the system for preparing the gel composite material further comprises a control mechanism configured to control a moving speed of the movable impregnation mechanism, wherein the control mechanism is further configured to control an unwinding speed of the first unwinding device, the second unwinding device, and the third unwinding device, the control mechanism is further configured to control a dispensing rate and a dispensing temperature of the impregnation device, and the control mechanism is further configured to control a winding rate of the first rewinding device and the second rewinding device.

A method for preparing a gel composite material uses the system for preparing the gel composite material according to any of the foregoing embodiments. The method for preparing the gel composite material includes the following steps:

controlling the movable impregnation mechanism to move from a front end of the impregnation platform toward a rear end of the impregnation platform, during the movement, controlling the first unwinding device to lay the to-be-impregnated reinforcing body on the worktable, controlling the impregnation device to guide the prefabricated sol to the to-be-impregnated reinforcing body, and controlling the second unwinding device to cover the covering carrier on the upper surface of the reinforcing body after impregnating, and when the movable impregnation mechanism moves to the rear end of the impregnation platform, controlling the first unwinding device, the impregnation device, and the second unwinding device to stop operating;

controlling the movable impregnation mechanism to move from the rear end of the impregnation platform to the front end of the impregnation platform; and controlling the movable impregnation mechanism to move from the front end of the impregnation platform toward the rear end of the impregnation platform, and during the movement, controlling the third unwinding device to unwind the spacer carrier onto the lower surface of the gelled reinforcing body on the lower surface side of the reinforcing body, controlling the first rewinding device to wind and recycle the covering carrier, controlling the second rewinding device to rewind the gelled reinforcing body covered with the spacer carrier, and controlling the first unwinding device, the impregnation device and the second unwinding device to operate in sequence.

In an embodiment, the method further comprises a step of preheating the prefabricated sol when the impregnation device guides the prefabricated sol to the to-be-impregnated reinforcing body.

In an embodiment, the method for preparing the gel composite material further comprises a step of heating the worktable to heat the reinforcing body after impregnating, so as to promote gelation of the prefabricated sol.

In an embodiment, the prefabricated sol is at least one selected from the group consisting of alumina sol, silicon oxide sol, titanium oxide sol, and magnesium oxide sol;

the covering carrier is a water-impermeable thin layer material;

the reinforcing body is made of fiber felt material or fiber block material; and the spacer carrier is a spacer mesh.

In an embodiment, the covering carrier is a film carrier or a non-woven fabric carrier; and the reinforcing body is at least one selected from the group consisting of glass fiber felt or glass fiber block, aluminum silicate fiber felt or aluminum silicate fiber block, PET fiber felt or PET fiber block, polyacrylonitrile fiber felt or polyacrylonitrile fiber block, rock wool fiber felt or rock wool fiber block, and wool felt or wool block.

The system for preparing the gel composite material can perform periodic impregnating and rewinding to recycle the gelled gel composite material product by moving the impregnation mechanism back and forth along the impregnation platform. In particular, during the movement of the impregnation mechanism from the front end of the impregnation platform to the rear end of the impregnation platform, the first unwinding device can be controlled to lay the to-be-impregnated reinforcing body on the worktable, the impregnation device can be controlled to guide the prefabricated sol to the to-be-impregnated reinforcing body, and the second unwinding device can be controlled to cover the covering carrier on the upper surface of the reinforcing body after impregnating. When the movable impregnation mechanism moves to the rear end of the impregnation platform, the first unwinding device, the impregnation device, and the second unwinding device can be controlled to stop operating. Then, the movable impregnation mechanism can be controlled to move from the rear end of the impregnation platform to the front end of the impregnation platform. During the movement, the third unwinding device can be controlled to unwind the spacer carrier onto the lower surface of the gelled reinforcing body on the lower surface side of the reinforcing body, the first rewinding device can be controlled to wind and recycle the covering carrier, and the second rewinding device can be controlled to rewind the gelled reinforcing body covered with the spacer carrier, and the first unwinding device, the impregnation device and the second unwinding device can be controlled to operate in sequence.

The system for preparing the gel composite material and the method for preparing a gel composite material using the system for preparing the gel composite material have high degree of automation, and can significantly improve production efficiency, thereby reducing production costs.

DETAILED DESCRIPTION OF THE EMBODIMENTS

Figure 1:
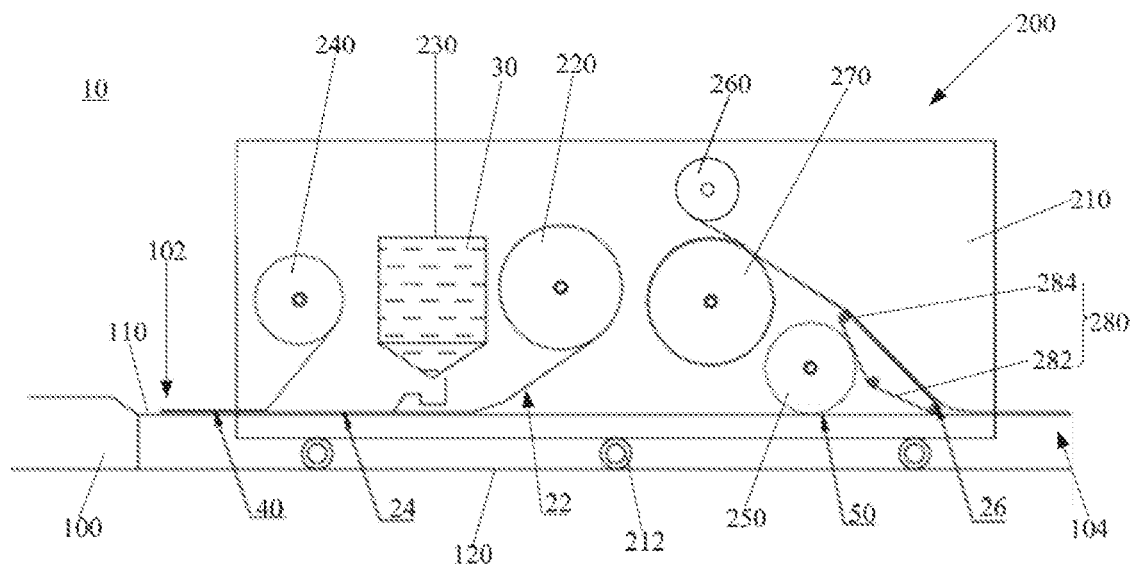
FIG. 1 is a schematic structural diagram of a system for preparing a gel composite material according to an embodiment.

In order to facilitate understanding of the present disclosure, the present disclosure will be described more fully below with reference to related drawings. The preferred embodiments of the present disclosure are shown in the drawings. However, the present disclosure can be implemented in many different forms and is not limited to the embodiments described herein. On the contrary, the purpose of providing these embodiments is to make the understanding of the present disclosure more thorough and comprehensive.

It should be noted that when an element is referred to as being "fixed to" another element, it can be directly located on another element or there may also be an intermediate element. When an element is considered to be "connected to" another element, it may be directly connected to another element or there may also be an intermediate element.

Unless otherwise defined, all technical and scientific terms used herein have the same meaning as commonly understood by those skilled belonging to the technical field of the present disclosure. The terminology used in the description of the present disclosure herein is for the purpose of describing specific embodiments and is not intended to limit the present disclosure. The term "and/or" as used herein includes any and all combinations of one or more related listed items.

Figure 2:
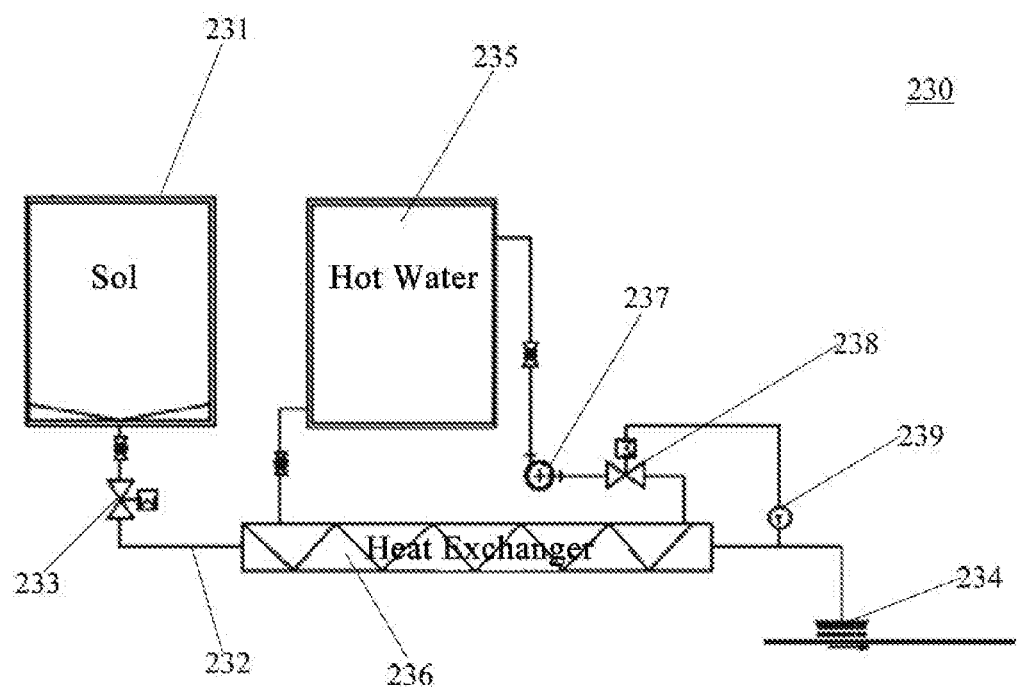
FIG. 2 is a schematic structural diagram of the sol impregnation device in FIG. 1.

Referring to FIG. 1 and FIG. 2, a system for preparing a gel composite material 10 according to an embodiment includes an impregnation platform 100 and a movable impregnation mechanism 200.

The impregnation platform 100 has a worktable 110. The movable impregnation mechanism 200 includes a fixing base 210, and a first unwinding device 220, an impregnation device 230, a second unwinding device 240, a third unwinding device 250, a first rewinding device 260, and a second rewinding device 270 that are disposed on the fixing base 210. The fixing base 210 can move back and forth along the impregnation platform 110. The first unwinding device 220 is configured to unwind a to-be-impregnated reinforcing body 22 to lay the to-be-impregnated reinforcing body 22 on the worktable 110. The impregnation device 230 is configured to guide a prefabricated sol 30 to the to-be-impregnated reinforcing body 22 laid on the impregnation platform 100. The second unwinding device 240 is configured to apply a covering carrier 40 on an upper surface of the reinforcing body after impregnating 24. The third unwinding device 250 is configured to unwind a spacer carrier 50 onto a lower surface of the gelled reinforcing body 26 on the lower surface side of the reinforcing body 26. The first rewinding device 260 is configured to wind and recycle the covering carrier 40. The second rewinding device 270 is configured to wind the gelled reinforcing body 26 covered with the spacer carrier 50 on one side.

In this embodiment, the impregnation platform 100 further has a guide rail 120, and the fixing base 210 is provided with wheels 212 and a moving driving component (not shown). The wheels 212 are disposed on the guide rail 120, and the moving driving component is configured to drive the wheels 212 to move along the guide rail 120. Preferably, there are two guide rails 120, which are each located on both sides of a main body of the impregnation platform 100.

The first unwinding device 220, the second unwinding device 240, the third unwinding device 250, the first rewinding device 260, and the second rewinding device 270 each has a mounting shaft, a rotation driving component, and a tensile force controlling component. The rotation driving component is correspondingly connected to the mounting shaft to drive the mounting shaft to rotate, and the tensile force controlling component is configured to control a tensile force of stretching. As for the first unwinding device 220, its mounting shaft is configured to mount a coil of the to-be-impregnated reinforcing body 22, its rotation driving component is connected to the mounting shaft to drive the mounting shaft to rotate when the to-be-impregnated reinforcing body 22 is applied on the worktable 110, and its tensile force controlling component is configured to detect and control the tensile force of the to-be-impregnated reinforcing body 22 when the to-be-impregnated reinforcing body 22 is applied on the worktable 110. The rotation driving component can adjust the rotation speed in real time according to the tensile force data feedback.

In addition, the second unwinding device 240 for unwinding the covering carrier 40 further includes an unfolding component (not shown) configured to unfold the covering carrier 40. The unfolding component may be a scraping rod or other structures mounted on the fixing base 210, such that the covering carrier 40 can be evenly covered on the reinforcing body after impregnating 24.

In this embodiment, the impregnation platform 100 is also provided with a temperature controlling device (not shown) corresponding to the worktable 110. The temperature controlling device is configured to control the temperature of the worktable 110. A temperature controlling energy source of the temperature controlling device may be, but not limited to, a fluid medium, microwave, and/or infrared ray. Fluid medium heating refers to heating using a pipeline through which the fluid medium of a heat source flows. For example, in a specific embodiment, the temperature controlling device is a system that uses circulating water for heating, which includes a circulating pipe, a circulating pump, a water temperature monitoring element, a heating element, and the like, which are disposed under the worktable 110. In the circulation pipeline, hot water can be circulated by the circulation pump to heat the worktable 110. The water temperature monitoring element can monitor the temperature of the circulating water in real time. The heating element is configured to heat the circulating water and may adjust the heating power according to the temperature monitored in real time. By providing the temperature controlling device on the impregnation platform 100, the reinforcing body after impregnating 24 can be heated to promote the gelation of the prefabricated sol 30 therein. The temperature controlling energy source being microwave and/or infrared ray refers to heating using microwave and/or infrared ray.

Further, the system for preparing the gel composite material 10 of this embodiment further includes a rewind guiding device 280. The rewind guiding device 280 is configured to guide the covering carrier 40 and the spacer carrier 50 along with the gelled reinforcing body 26 to the first rewinding device 260 and the second rewinding device 270, respectively.

Specifically, in one embodiment, the rewind guiding device 280 includes a transmission belt 282 and a transmission roller 284. The transmission belt 282 is engaged with the transmission roller 284 and is configured to guide the covering carrier 40 and the spacer carrier 50 along with the gelled reinforcing body 26 to the first rewinding device 260 and the second rewinding device 270, respectively. More specifically, the first rewinding device 260 and the second rewinding device 270 are located above the third unwinding device 250 and the rewind guiding device 280. The first rewinding device 260 is located above the second rewinding device 270. The third unwinding device 250 is located between the second rewinding device 270 and the rewind guiding device 280. During rewinding and recycling, the spacer carrier 50 on the third unwinding device 250 may be firstly pulled out and then covered on a lower surface of the gelled reinforcing body 26. After that, the spacer carrier 50 together with the gelled reinforcing body 26 covered with the covering carrier 40 on the upper surface thereof are drawn onto the second rewinding device 270, thus performing the rewinding of the spacer carrier 50 and the gelled reinforcing body 26. Sequentially, the covering carrier 40 goes upward and is winded by the first rewinding device 260 for recycling.

In this embodiment, the first unwinding device 220, the impregnation device 230, and the second unwinding device 240 are disposed adjacent to one end of the fixing base 210, the impregnation device 230 is located between the first unwinding device 220 and the second unwinding device 240, and the second unwinding device 240 is closer to the corresponding end. The third unwinding device 250, the first rewinding device 260, the second rewinding device 270, and the rewind guiding device 280 are disposed more adjacent to the other end of the fixing base, and the first rewinding device 260 is located above the third unwinding device 250 and the rewind guiding device 280.

Referring to FIG. 2, in this embodiment, the impregnation device 230 includes a sol container 231 and a sol outlet pipe 232. The sol container 231 is configured to contain a certain amount of the prefabricated sol 30, for example, each barrel of the sol container 231 contains the prefabricated sol 30 only enough for impregnating one roll of reinforcing body, thereby dispensing the sol periodically and ensuring the quality of the prefabricated sol 30. The sol outlet pipe 232 is in communication with the sol container 231 to guide the prefabricated sol 30 in the sol container 231 to the to-be-impregnated reinforcing body 22. The sol outlet pipe 232 is provided with a regulating valve 233. Further, the impregnation device 230 includes an impregnation component 234. The impregnation component 234 is disposed at a dispensing end of the sol outlet pipe 232 and configured to impregnate the prefabricated sol 30 onto the to-be-impregnated reinforcing body 22. The impregnation component 234 can allow the prefabricated sol 30 to be quickly combined with the to-be-impregnated reinforcing body 22 and allow the prefabricated sol 30 to evenly flow out and penetrate the to-be-impregnated reinforcing body 22.

Still further, in this embodiment, the impregnation device 230 includes a heating component configured to heat the prefabricated sol 30. Specifically, in one embodiment, the heating component includes a hot water container 235 and a heat exchanger 236 in communication with the hot water container 235. The sol outlet pipe 232 extends through the heat exchanger 236 to perform heat exchange between the prefabricated sol 30 and the hot water in the heat exchanger 236. A circulation component 237 is further provided between the hot water container 235 and the heat exchanger 236. The circulation component 237 is configured to circulate hot water between the hot water container 235 and the heat exchanger 236. The circulation component 237 may be, but not limited to, a circulation pump or the like.

Still further, a circulation control valve 238 is further provided on a circulation pipe communicating the hot water container 235 and the heat exchanger 236. The circulation control valve 238 is configured to control the flow rate of hot water flowing through the heat exchanger 236, thereby controlling the temperature of the prefabricated sol 30 in the sol outlet pipe 232. Preferably, a temperature detecting sensor 239 is provided adjacent to the dispensing end of the sol outlet pipe 232. The temperature detecting sensor 239 is connected to the circulation control valve 238, such that an opening degree of the circulation control valve 238 can be adjusted according to a temperature data of the prefabricated sol 30 detected in real time.

By providing the heating component in the impregnation device 230, the prefabricated sol 30 can be heated. The reaction speed of the prefabricated sol 30 after being heated to a certain temperature will be accelerated, which is beneficial to accelerate the gelation process of the prefabricated sol 30, thereby improving production efficiency.

In this embodiment, the system for preparing the gel composite material 10 further includes a control mechanism. The control mechanism is configured to control the moving speed of the movable impregnation mechanism 200. The control mechanism is further configured to control an unwinding speed of the first unwinding device 220, the second unwinding device 240, and the third unwinding device 250. The control mechanism is further configured to control a dispensing rate and a dispensing temperature of the impregnation device 230. The control mechanism is further configured to control winding rates of the first rewinding device 260 and the second rewinding device 270, etc. For example, in a specific embodiment, the control mechanism controls the moving speed of the movable impregnation mechanism 200, such that when the movable impregnation mechanism 200 moves from the front end to the rear end of the impregnation platform 100, the reinforcing body after impregnating 24 at the front end is gelled. This embodiment also provides a method for preparing a gel composite material using the system for preparing the gel composite material 10 according to any of the foregoing embodiments. The method for preparing the gel composite material includes the following steps:

controlling the movable impregnation mechanism 200 to move from a front end 102 of the impregnation platform 100 toward a rear end 104 of the impregnation platform 100, during the movement, controlling the first unwinding device 220 to lay the to-be-impregnated reinforcing body 22 on the worktable 110, controlling the impregnation device 230 to guide the prefabricated sol 30 to the to-be-impregnated reinforcing body 22, and controlling the second unwinding device 240 to cover the covering carrier 40 on the upper surface of the reinforcing body after impregnating 24, and when the movable impregnation mechanism 200 moves to the rear end 104 of the impregnation platform 100, controlling the first unwinding device 220, the impregnation device 230 and the second unwinding device 240 to stop operating;

controlling the movable impregnation mechanism 200 to move from the rear end 104 of the impregnation platform 100 to the front end 102 of the impregnation platform 100; and controlling the movable impregnation mechanism 200 to move from the front end 102 of the impregnation platform 100 toward the rear end 104 of the impregnation platform 100, and during the movement, controlling the third unwinding device 250 to unwind the spacer carrier 50 onto the lower surface of the gelled reinforcing body 26 on the lower surface side of the reinforcing body 26, controlling the first rewinding device 260 and the second rewinding device 270 to wind and recycle the covering carrier 40 and the gelled reinforcing body 26 covered with the spacer carrier 50 on one side, respectively, and controlling the first unwinding device 220, the impregnation device 230 and the second unwinding device 240 to operate in sequence.

The front end 102 and the rear end 104 described herein are not definitely indicated in front or rear, but are only used to illustrate the both ends of the impregnation platform 100.

In this embodiment, the method further includes a step of preheating the prefabricated sol 30 when the impregnation device 230 guides the prefabricated sol 30 to the to-be-impregnated reinforcing body 22. Further, the method for preparing the gel composite material further includes a step of heating the worktable 110 for heating the reinforcing body after impregnating 24, so as to promote gelation of the prefabricated sol 30.

In this embodiment, the prefabricated sol 30 is at least one selected from the group consisting of alumina sol, silicon oxide sol, titanium oxide sol, and magnesium oxide sol. The covering carrier 40 is a water-impermeable thin layer material, such as a film carrier or a non-woven fabric carrier, etc. The to-be-impregnated reinforcing body 22 is made of fiber felt material or fiber block material, such as at least one of glass fiber felt or glass fiber block, aluminum silicate fiber felt or aluminum silicate fiber block, PET fiber felt or PET fiber block, polyacrylonitrile fiber felt or polyacrylonitrile fiber block, rock wool fiber felt or rock wool fiber block, wool felt or wool block. The spacer carrier 50 is a spacer mesh.

By moving the movable impregnation mechanism 200 back and forth along the impregnation platform 100, the system for preparing the gel composite material 10 can perform periodic impregnating and rewinding to recycle the gelled gel composite material product. The gelled gel composite material recycled by rewinding can be further placed in a drying area to stand for aging and drying.

The system for preparing the gel composite material 10 and the method for preparing a gel composite material using the system for preparing the gel composite material 10 have high degree of automation, and can significantly improve the production efficiency, thereby reducing production costs.

The technical features of the above-mentioned embodiments can be combined arbitrarily. To simplify the description, not all possible combinations of the technical features of the above-mentioned embodiments are described. However, the combination of these technical features should be considered to fall within the scope described in this specification, as long as there is no contradiction.

The above-mentioned embodiments only express several implementation modes of the present invention which are described concretely and detailedly, but they should not be construed as limiting the scope of the disclosure. It should be noted that, for a person of ordinary skill in the art, a number of modifications and improvements can be made without departing from the concept of the present disclosure, which all fall within the protection scope of the present invention. Therefore, the protection scope of the disclosure shall be subject to the appended claims.

What is claimed is:

1. A system for preparing a gel composite material, comprising:
   an impregnation platform having a worktable; and
   a movable impregnation mechanism comprising:
      a fixing base capable of moving back and forth along the impregnation platform, and
      a first unwinding device, an impregnation device, a second unwinding device, a third unwinding device, a first rewinding device, and a second rewinding device, which are disposed on the fixing base, wherein
   the first unwinding device is configured to unwind a to-be-impregnated reinforcing body to lay the reinforcing body to be impregnated on the worktable;
   the impregnation device is configured to guide a prefabricated sol to the to-be-impregnated reinforcing body laid on the impregnation platform;
   the second unwinding device is configured to apply a covering carrier on an upper surface of the reinforcing body after impregnating;
   the third unwinding device is configured to unwind a spacer carrier onto a lower surface of the gelled reinforcing body on the lower surface side of the reinforcing body;
   the first rewinding device is configured to wind the covering carrier applied on the gelled reinforcing body; and
   the second rewinding device is configured to wind the gelled reinforcing body covered with the spacer carrier on one side.

2. The system for preparing the gel composite material according to claim 1, wherein the impregnation platform further has a guide rail, the fixing base is provided with wheels disposed on the guide rail and a moving driving component configured to drive the wheels to move along the guide rail.

3. The system for preparing the gel composite material according to claim 1, wherein the first unwinding device, the second unwinding device, the third unwinding device, the first rewinding device, and the second rewinding device each has a mounting shaft, a rotation driving component, and a tensile force controlling component, the rotation driving component is correspondingly connected to the mounting shaft to drive the mounting shaft to rotate, the tensile force controlling component is configured to control a tensile force of stretching.

4. The system for preparing the gel composite material according to claim 3, wherein the second unwinding device further comprises an unfolding component configured to unfold the covering carrier.

5. The system for preparing the gel composite material according to claim 1, wherein the impregnation platform is further provided with a temperature controlling device corresponding to the worktable, the temperature controlling device being configured to control a temperature of the worktable.

6. The system for preparing the gel composite material according to claim 5, wherein a temperature controlling energy source of the temperature controlling device is a fluid medium, microwave, and/or infrared ray.

7. The system for preparing the gel composite material according to claim 1, further comprising a rewind guiding device configured to guide the covering carrier and the gelled reinforcing body covered with the spacer carrier on one side to the first rewinding device and the second rewinding device, respectively.

8. The system for preparing the gel composite material according to claim 7, wherein the rewind guiding device comprises a transmission belt and a transmission roller, the transmission belt being engaged with the transmission roller and configured to guide the covering carrier and the gelled reinforcing body covered with the spacer carrier on one side to the first rewinding device and the second rewinding device, respectively.

9. The system for preparing the gel composite material according to claim 1, wherein the impregnation device comprises a sol container and a sol outlet pipe, the sol outlet pipe being in communication with the sol container to guide the prefabricated sol in the sol container to the to-be-impregnated reinforcing body.

10. The system for preparing the gel composite material according to claim 9, wherein the impregnation device further comprises an impregnation component disposed at a dispensing end of the sol outlet pipe and configured to impregnate the to-be-impregnated reinforcing body with the prefabricated sol.

11. The system for preparing the gel composite material according to claim 9, wherein the impregnation device further comprises a heating component configured to heat the prefabricated sol.

12. The system for preparing the gel composite material according to claim 11, wherein the heating component includes a hot water container and a heat exchanger in communication with the hot water container, the sol outlet pipe extending through the heat exchanger to enable heat exchange between the prefabricated sol and the hot water in the heat exchanger.

13. The system for preparing the gel composite material according to claim 12, wherein a circulation component is further provided between the hot water container and the heat exchanger, the circulation component is configured to circulate hot water between the hot water container and the heat exchanger.

14. The system for preparing the gel composite material according to claim 13, wherein a circulation control valve is further provided on a circulation pipe in communication with the hot water container and the heat exchanger, a temperature detecting sensor is provided adjacent to the dispensing end of the sol outlet pipe and is connected to the circulation control valve, such that an opening degree of the circulation control valve is adjusted according to a temperature data of the prefabricated sol detected in real time.

15. The system for preparing the gel composite material according to claim 1, further comprising a control mechanism configured to control a moving speed of the movable impregnation mechanism, wherein the control mechanism is further configured to control an unwinding speed of the first unwinding device, the second unwinding device, and the third unwinding device, the control mechanism is further configured to control a dispensing rate and a dispensing temperature of the impregnation device, and the control mechanism is further configured to control a winding rate of the first rewinding device and the second rewinding device.

16. A method for preparing a gel composite material using the system for preparing the gel composite material according to claim 1, the method comprising the following steps:

controlling the movable impregnation mechanism to move from a front end of the impregnation platform toward a rear end of the impregnation platform, during the movement, controlling the first unwinding device to lay the to-be-impregnated reinforcing body on the worktable, controlling the impregnation device to guide the prefabricated sol to the to-be-impregnated reinforcing body, and controlling the second unwinding device to cover the covering carrier on the upper surface of the reinforcing body after impregnating, and when the movable impregnation mechanism moves to the rear end of the impregnation platform, controlling the first unwinding device, the impregnation device, and the second unwinding device to stop operating;

controlling the movable impregnation mechanism to move from the rear end of the impregnation platform to the front end of the impregnation platform; and controlling the movable impregnation mechanism to move from the front end of the impregnation platform toward the rear end of the impregnation platform, and during the movement, controlling the third unwinding device to unwind the spacer carrier onto the lower surface of the gelled reinforcing body on the lower surface side of the reinforcing body, controlling the first rewinding device to wind and recycle the covering carrier, controlling the second rewinding device to rewind the gelled reinforcing body covered with the spacer carrier, and controlling the first unwinding device, the impregnation device and the second unwinding device to operate in sequence.

17. The method for preparing the gel composite material according to claim 16, further comprising a step of preheating the prefabricated sol when the impregnation device guides the prefabricated sol to the to-be-impregnated reinforcing body.

18. The method for preparing the gel composite material according to claim 16, further comprising a step of heating the worktable to heat the reinforcing body after impregnating, so as to promote gelation of the prefabricated sol.

19. The method for preparing the gel composite material according to claim 16, wherein the prefabricated sol is at least one selected from the group consisting of alumina sol, silicon oxide sol, titanium oxide sol, and magnesium oxide sol;

the covering carrier is a water-impermeable thin layer material;

the reinforcing body is made of fiber felt material or fiber block material; and the spacer carrier is a spacer mesh.

20. The method for preparing the gel composite material according to claim 19, wherein the covering carrier is a film carrier or a non-woven fabric carrier; and the reinforcing body is at least one selected from the group consisting of glass fiber felt or glass fiber block, aluminum silicate fiber felt or aluminum silicate fiber block, PET fiber felt or PET fiber block, polyacrylonitrile fiber felt or polyacrylonitrile fiber block, rock wool fiber felt or rock wool fiber block, and wool felt or wool block.

* * * * *